May 13, 1924.

P. C. WITHROW

HAND BRAKE MECHANISM

Filed Sept. 8, 1923

1,494,049

2 Sheets-Sheet 1

INVENTOR
P.C. WITHROW
BY E. E. Huffman
ATTORNEY

May 13, 1924.

P. C. WITHROW 1,494,049

HAND BRAKE MECHANISM

Filed Sept. 8, 1923

2 Sheets-Sheet 2

INVENTOR
P.C. WITHROW

BY *E. E. Huffman*

ATTORNEY

Patented May 13, 1924.

1,494,049

UNITED STATES PATENT OFFICE.

PAUL C. WITHROW, OF DENVER, COLORADO, ASSIGNOR TO RAILWAY DEVICES COMPANY, OF ST. LOUIS, MISSOURI, A CORPORATION OF MISSOURI.

HAND-BRAKE MECHANISM.

Application filed September 8, 1923. Serial No. 661,539.

*To all whom it may concern:*

Be it known that I, PAUL C. WITHROW, a citizen of the United States of America, residing at Denver, Denver County, State of Colorado, United States of America, have invented a certain new and useful Hand-Brake Mechanism, of which the following is such a full, clear, and exact description as will enable any one skilled in the art to which it appertains to make and use the same, reference being had to the accompanying drawings, forming part of this specification.

My invention relates to a hand-brake mechanism and particularly to that form of brake mechanism in which a pivotally mounted handle functions to move a ratchet device into or out of operating position to rotate the brake staff in the direction to apply the brake. Such devices often fail to return to normal position when the brake is released and the object of the present invention is to provide positive means for rotating the brake staff in the reverse direction from that in which it is rotated to apply the brake. This I accomplish, in the form of device shown, by providing a secondary handle adapted to engage with the ratchet wheel on the brake staff in such a manner that the required reverse rotation may be imparted thereto.

Figure 1:
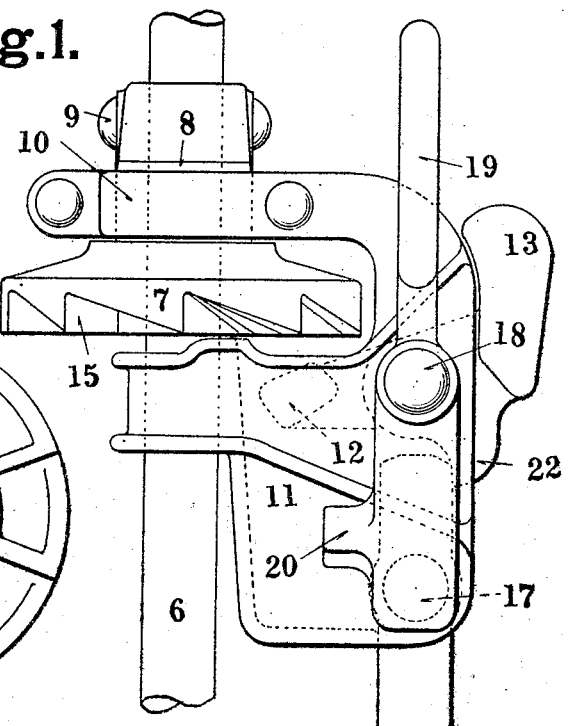
Figure 2:
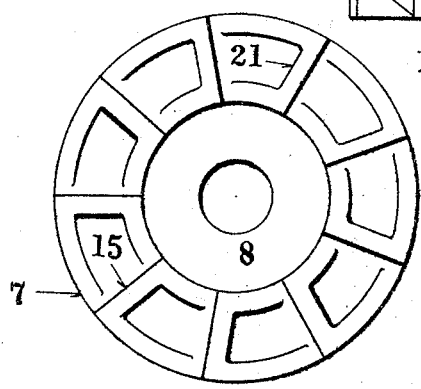
Figure 3:
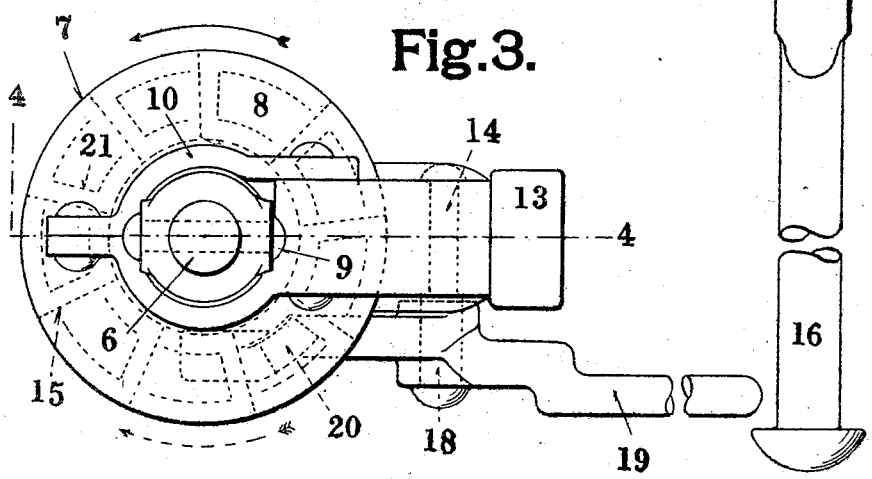
Figure 4:
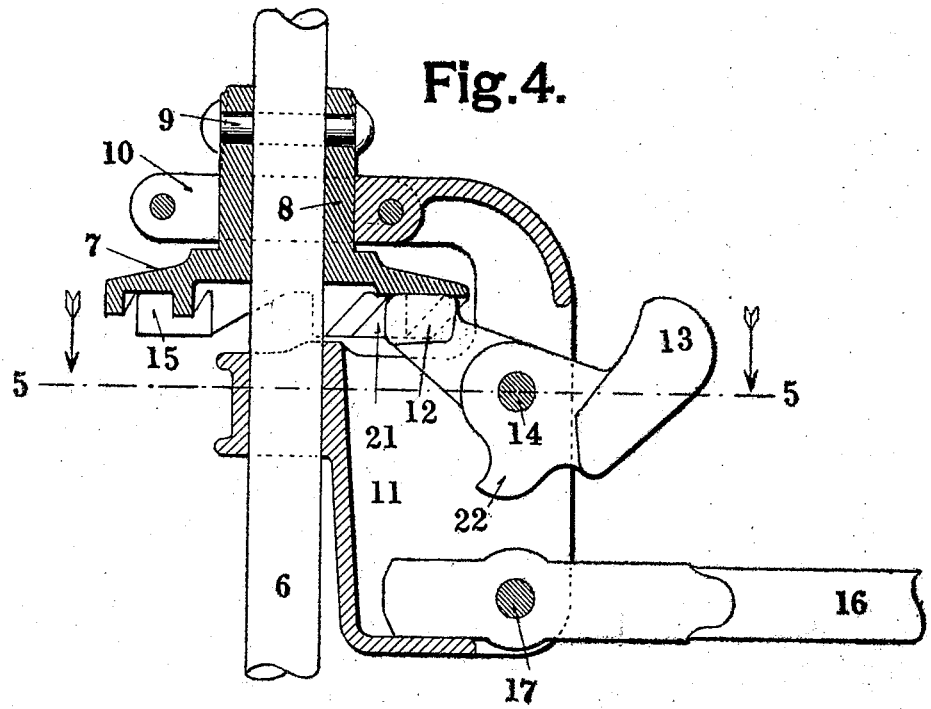
Figure 5:
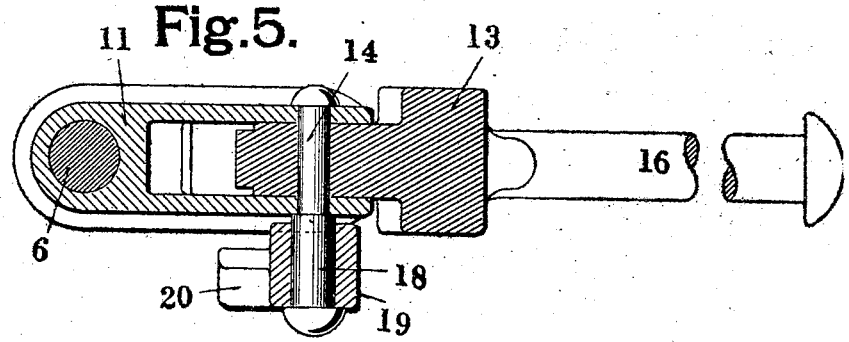

In the accompanying drawings which illustrates one form of brake mechanism made in accordance with my invention Fig. 1, is a side view, Fig. 2 is a bottom plan view of the ratchet wheel, Fig. 3 is a top plan view, Fig. 4 is a vertical section taken on the line 4—4 of Fig. 3, and Fig. 5 is a horizontal section taken on the line 5—5 of Fig. 4.

The brake staff, a part only of which is shown, is indicated by the numeral 6. A ratchet wheel surrounds the staff 6 and is provided with a hub 8. Passing through the upper part of this hub 8 and the staff 6 is a bolt or rivet 9 so that the ratchet wheel and staff are moved in unison. A yoke 10 carried by a housing 11 forms a bearing for the hub 8 of the ratchet wheel, the housing itself forming a bearing for the brake staff below the wheel. In order that the wheel may be placed in position, the yoke 10 is formed in two parts bolted or riveted together. 12 is a dog provided at its outer end with a weight 13 and pivotally mounted on a bolt or rivet 14 so that when free to move by gravity it will engage with the teeth of the ratchet wheel 7. The operating handle 16 is pivoted in the housing 11 on a pin 17 and normally hangs in a vertical position as shown in Fig. 1, in which position its upper end engages with a tail piece 22 on the dog 12 so as to hold the dog out of engagement with the ratchet wheel.

When it is desired to apply the brake the handle 16 is raised into a horizontal position, as shown in Fig. 4, allowing the dog 12 to engage with the ratchet wheel 7. A reciprocating movement is now imparted to the housing 11 by means of the handle 16, which movement through the action of the dog 12 on the vertical faces 15 of the teeth of the ratchet wheel, rotates said wheel and the attached brake staff in the direction indicated by the broken arrow in Fig. 3, thus applying the brake. It will be understood that during the application of the brake reverse movement of the staff is prevented by the usual ratchet gear and foot pawl (not shown). As the movement of the pawl in applying the brake is independent of the operating handle, no jumping motion is imparted to the handle during such application.

In order to move the staff in the reverse direction to positively release the brake I provide the rivet 14 with an extension 18 on which is mounted a secondary handle 19. The inner end of the secondary handle is made heavy so as to normally hang in a vertical position by gravity as shown in Fig. 1. The extension 18 is preferably made larger than the body of the rivet 14, as best shown in Fig. 5, to prevent binding of the handle 19. The inclined faces of the teeth of the ratchet wheel are recessed so as to provide vertical faces 21 opposed to the faces 15 and the handle 19 is provided with a finger 20, so shaped as to enter any one of the recesses and engage with its face 21 when the handle 19 is moved into horizontal position. If the housing 11 be now moved in counter-clockwise direction by the handle 19 the ratchet wheel and staff will be rotated in reverse direction as indicated by the arrow in Fig. 3, to positively release the brake. As the finger 20 does not have a ratchet action on the wheel 7 it will be necessary to disengage the finger by raising the handle before a second impulse can be imparted to the shaft. Usually, however, a single movement of the auxiliary handle will be sufficient to secure the complete release of the brake.

Having fully described my invention what I claim as new and desire to secure by Letters Patent of the United States is:

1. In a device of the class described, the combination with a brake staff, of a ratchet wheel carried thereby, an oscillating member mounted on the staff and cooperating with said wheel, an operating handle for actuating said member to apply the brake, and a secondary handle carried by said oscillating member for rotating the staff in reverse direction.

2. In a device of the class described, the combination with a brake staff, of a ratchet wheel carried thereby, an oscillating member mounted on said staff and co-operating with said wheel, an operating handle for actuating said member to apply the brake, and a secondary handle also carried by said member and co-operating with said wheel to move the staff in reverse direction.

3. In a device of the class described, the combination with a brake staff, of a ratchet wheel carried thereby, the inclined faces of the teeth of said wheel being recessed, an oscillating member mounted on said staff and co-operating with said wheel, an operating handle for actuating said member to apply the brake, and a secondary handle adapted to engage the recesses in the said wheel to move the staff in reverse direction.

4. In a device of the class described, the combination with a brake staff, of a ratchet wheel carried thereby, an oscillating member mounted on said staff, a dog carried by said member and co-operating with said wheel, an operating handle for moving said member to apply the brake and also controlling the engagement of said dog with said wheel, and a secondary handle carried by said member for rotating said staff in reverse direction.

5. In a device of the class described, the combination with a brake staff, of a ratchet wheel carried thereby, the inclined faces of the teeth of said wheel being recessed, an oscillating member mounted on said staff, a dog carried by said member and co-operating with said wheel, an operating handle for moving said member to apply the brake and also controlling the engagement of said dog with said wheel, and a secondary handle carried by said member and adopted to engage the recesses in said wheel for rotating the staff in reverse direction.

In testimony whereof, I have hereunto set my hand and affixed my seal.

PAUL C. WITHROW.